US008880645B1

(12) United States Patent
Bertz et al.

(10) Patent No.: US 8,880,645 B1
(45) Date of Patent: Nov. 4, 2014

(54) REGISTRATION OF MEDIA CONTENT WITH A CONTENT DISTRIBUTION NETWORK FOR TRANSFER AT A LATER TIME

(75) Inventors: Lyle T. Bertz, Lee's Summit, MO (US); Mujahid R. Khan, Ashburn, VA (US); Daniel Joe Sershen, Overland Park, KS (US); James Walter Norris, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 9 days.

(21) Appl. No.: 13/609,410

(22) Filed: Sep. 11, 2012

(51) Int. Cl.
*G06F 15/16* (2006.01)

(52) U.S. Cl.
USPC ............................................... 709/217

(58) Field of Classification Search
USPC ............................................... 709/217
See application file for complete search history.

(56) References Cited

U.S. PATENT DOCUMENTS

| | | | |
|---|---|---|---|
| 5,530,472 A | 6/1996 | Bregman et al. | |
| 5,680,392 A | 10/1997 | Semaan | |
| 5,806,005 A | 9/1998 | Hull et al. | |
| 5,915,207 A | 6/1999 | Dao et al. | |
| 5,963,557 A | 10/1999 | Eng | |
| 6,246,430 B1 | 6/2001 | Peters et al. | |
| 6,774,926 B1 | 8/2004 | Ellis et al. | |
| 7,856,468 B2 | 12/2010 | Yoshimine et al. | |
| 8,064,080 B2 | 11/2011 | Kawai | |
| 2002/0015004 A1* | 2/2002 | Chino et al. | 345/2.1 |
| 2002/0038359 A1 | 3/2002 | Ihara et al. | |
| 2003/0184793 A1* | 10/2003 | Pineau | 358/1.15 |
| 2003/0224799 A1* | 12/2003 | Squibbs et al. | 455/450 |
| 2005/0209927 A1* | 9/2005 | Aaltonen et al. | 705/26 |
| 2006/0073795 A1 | 4/2006 | Mayblum et al. | |
| 2006/0130100 A1 | 6/2006 | Pentland | |
| 2006/0253444 A1 | 11/2006 | O'Toole et al. | |
| 2007/0219686 A1 | 9/2007 | Plante | |
| 2008/0022329 A1 | 1/2008 | Glad | |
| 2008/0155057 A1* | 6/2008 | Khedouri et al. | 709/217 |
| 2008/0263130 A1 | 10/2008 | Michalowitz et al. | |
| 2009/0189981 A1 | 7/2009 | Siann et al. | |
| 2009/0191913 A1 | 7/2009 | Jones | |
| 2010/0179883 A1* | 7/2010 | Devolites | 705/26 |
| 2010/0216429 A1* | 8/2010 | Mahajan | 455/411 |

(Continued)

OTHER PUBLICATIONS

Wimaxxed, "BBC, Telabria Conduct Live News Broadcast Over WiMax," Sep. 28, 2005, 3 pages, www.wimaxxed.com, http://www.wimaxxed.com/wimaxxed_news/20050928/bbc_telabria_c.html.

*Primary Examiner* — Kostas Katsikis (57) ABSTRACT

Embodiments disclosed herein provide systems and methods for registering media content with a CDN for transfer at a later time. In a particular embodiment, a method of operating a wireless communication device to deliver media content to a plurality of user devices over a Content Distribution Network (CDN) is provided. The method comprises transferring an upload registration request to the CDN that indicates the wireless communication device and an upload time. The method further comprises receiving an upload confirmation transferred from the CDN confirming the upload registration request and powering down after receiving the upload confirmation. The method further comprises powering up and obtaining the media content. After powering up and during the upload time, the method comprises transferring the media content for delivery to the CDN based on the upload confirmation, wherein the CDN subsequently transfers the media content to the user devices.

20 Claims, 4 Drawing Sheets

(56) References Cited

U.S. PATENT DOCUMENTS

| | | | |
|---|---|---|---|
| 2010/0223342 A1* | 9/2010 | Brown et al. | 709/206 |
| 2010/0235238 A1 | 9/2010 | Gupta et al. | |
| 2011/0264768 A1* | 10/2011 | Walker et al. | 709/218 |
| 2012/0117110 A1* | 5/2012 | Amidon et al. | 707/770 |
| 2013/0144968 A1* | 6/2013 | Berger | 709/217 |
| 2013/0190004 A1* | 7/2013 | Papakipos et al. | 455/456.1 |
| 2013/0260796 A1* | 10/2013 | Hasek | 455/456.3 |
| 2013/0282869 A1* | 10/2013 | Mate et al. | 709/219 |

\* cited by examiner

REGISTRATION OF MEDIA CONTENT WITH A CONTENT DISTRIBUTION NETWORK FOR TRANSFER AT A LATER TIME

TECHNICAL BACKGROUND

Content distribution networks (CDNs) store media content in content servers for efficient distribution to end-users over communication networks. The media content might be video, audio, images, documents, sensor data, and the like. The CDN servers are often geographically distributed and adapted to serve particular access networks. The users typically download the content in an on-demand manner from the CDN. The CDN enforces distribution rules on these downloads. The distribution rules control what content can be downloaded, when the content can be downloaded, where the content can be downloaded, and to whom the content can be downloaded—in addition to other rules. Thus, CDNs have an elaborate process for handling the distribution of media content to a multitude of end-users over various communication networks that cover large geographic areas.

Unfortunately, the techniques for uploading the content to the CDNs are not so elaborate. Media content is typically uploaded to the CDN from another computer system, as opposed to the CDN generating the media itself. For example, a website and all the content provided by the website may be uploaded to the CDN for distribution to user devices accessing the website through their web browsers and the Internet. A movie may be uploaded to the CDN for distribution to user media players. This upload is traditionally an on-demand process whereby the uploading system contacts the CDN and uploads the media content in a single communication session. If the content upload attempt fails, the uploading system typically tries the upload again at a later time.

More types of devices are capable of uploading content to a CDN than ever before. For example, modern smartphones are capable of generating media content and uploading that media content to a CDN. These smartphones (and other wireless devices) often have a limited amount of power to operate (i.e. battery power, solar power, etc.). In particular, various sensors, (video cameras, thermometers, radars, etc.) now generate and transfer content for distribution over CDNs to various end-users. While the present CDN upload process may work well for a video that is generated by a movie studio having a complex media computers, the current CDN upload process is deficient for many other types of content-uploading devices.

Overview

Embodiments disclosed herein provide systems and methods for registering media content with a CDN for transfer at a later time. In a particular embodiment, a method of operating a wireless communication device to deliver media content to a plurality of user devices over a Content Distribution Network (CDN) is provided. The method comprises transferring an upload registration request to the CDN that indicates the wireless communication device and an upload time. The method further comprises receiving an upload confirmation transferred from the CDN confirming the upload registration request and powering down after receiving the upload confirmation. The method further comprises powering up and obtaining the media content. After powering up and during the upload time, the method comprises transferring the media content for delivery to the CDN based on the upload confirmation, wherein the CDN subsequently transfers the media content to the user devices.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
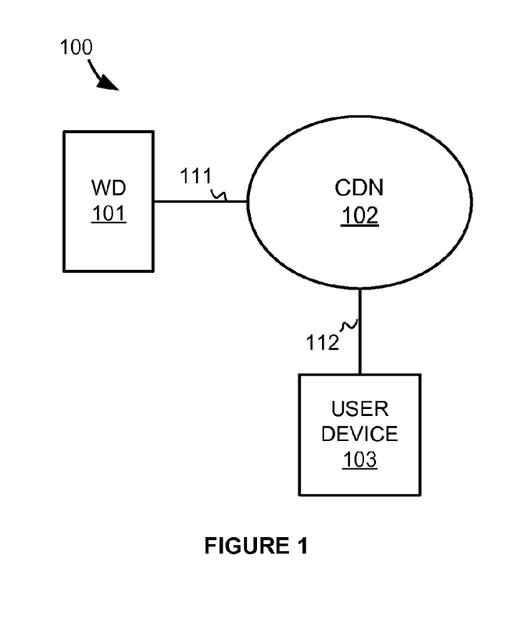
FIG. 1 illustrates a wireless communication system for registering media content with a CDN for transfer at a later time.

FIG. 1 illustrates wireless communication system 100. Wireless communication system 100 includes wireless communication device 101, content distribution network (CDN) 102, alternatively called a content delivery network, and user device 103. Wireless communication device 101 and CDN 102 communicate over wireless link 111. CDN 102 and user device 103 communicate over communication link 112.

In operation, CDN 102 provides media content to other systems and devices capable of accessing CDN 102 either directly or through other communication networks or systems. This media content may be audio/video files, websites, documents, software, or any other type of data. CDN 102 may include a single server or a collection of servers spread throughout a communication network or collection of communication networks in order to optimally provide data to other systems and devices. For example, CDN 102 may include servers within various access networks to better provide media content to systems and devices that use each access network.

In order for CDN 102 to provide media content, the media content must first be obtained from a content source. A content source may be any type of system or device that is capable of transferring data to CDN 102 directly or through other communication networks or systems. A content source may be a system or device that generated the content, either under the direction of a user or otherwise, or may be a system or device that merely stored media content in a memory system before transferring the media content to CDN 102.

As more content sources transfer content to CDN 102, the resources of CDN 102 may become less available. Similarly, the resources of communication networks used by the content sources to access CDN 102 may also become less available. Given these limited resources, it may be more efficient for a content source to transfer content to CDN 102 at one time over another. For example, while a content source may be ready to transfer media content to CDN 102 at a particular time, that time may be a time of peak CDN 102 usage. During this peak time CDN 102 may not be able to receive the media content or the transfer of the media content to CDN 102 may be more time consuming. Thus, transferring the media content at a different time, such as an off peak time, may be beneficial.

Additionally, many modern content sources operate on limited power sources, such as battery or solar power. Thus, it may be beneficial for content sources with limited power to upload media content when the limited power can be better used for powering an upload over a wireless communication interface. In a particular example, a cellular phone operates on battery power and it would be beneficial to transfer media content from the cellular phone to CDN 102 at a time that would best conserve the battery life of the cellular phone.

Figure 2:
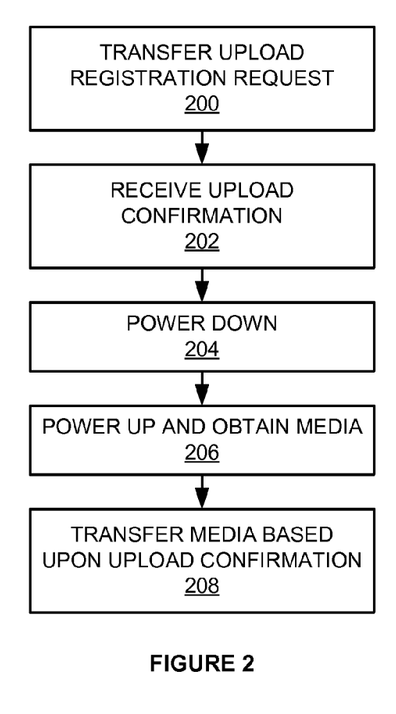
FIG. 2 illustrates the operation of the wireless communication system for registering media content with a CDN for transfer at a later time.

FIG. 2 illustrates the operation of wireless communication system 100 to register media content with a CDN for transfer at a later time. An upload registration request is transferred from wireless device 101 to CDN 102 that indicates the wireless device 101 and an upload time (step 200). The upload registration request may be transferred in response to a user request made by a user of wireless device 101, automatically upon wireless device 101 generating or receiving media content, or for any other reason. The registration request may indicate wireless device 101 by a network address of wireless device 101, a unique identifier, such as an electronic serial number (ESN) for wireless device 101, or by any other method of indicating a wireless device.

The upload time may be any time when wireless device 101 is able to upload media content to CDN 102. The upload time may be any time extending from the time immediately after the upload registration process described herein. In some embodiments, the upload time is merely a suggested time from wireless device 101 and CDN 102 may determine an actual upload time while considering the suggested upload time received from wireless device 101. Additionally, the upload time may be entered by a user of wireless device 101 or may be determined automatically by wireless device 101 by taking into account various factors, such as CDN 102 resource usage, assess network resource usage, access network type, power supply usage (i.e. battery level, solar panel output, etc.), or any other factor that may contribute to a desirable upload time. For example, a user may enter an upload time that corresponds to wireless device being on a WIFI network rather than a cellular network and corresponds to a time when a battery power level for wireless device 101 is expected to be high or charging.

In some embodiments, the upload registration request may further indicate information about the media content to be uploaded to CDN 102. The media content may include an audio/video file, picture, document, website, or any other type of data. Thus, the information in the request may include a type of the media content, a file size of the media content, or any other information about the media content that may be useful to CDN 102. For example, the file size may be useful in order for CDN 102 to determine a best upload time for receiving a file of the indicated size and/or allocate storage space in CDN 102 to store the media content once CDN 102 receives the media content.

After transferring the upload registration request, an upload confirmation is received at wireless device 101 from CDN 102 confirming the upload registration request (step 202). The upload confirmation may simply indicate that wireless device 101 may upload the media content at the time indicated by the upload registration request. Alternatively, the media content may contain other or additional instructions for wireless device 101 to follow when uploading the media content. For example, the upload confirmation may include an upload time determined by CDN 102, an address for a particular system/server in CDN 102 to which the media content should be directed, or any other information that may be useful when uploading the media content.

In some embodiments, the registration steps 200 and 202 allow CDN 102 to reserve resources at the determined upload time so that the resources are available to wireless device 101 at the upload time. This ensures that wireless device 101 will be able to upload the media content to CDN 102 without having to wait for resources to become available.

Wireless device 101 powers down after receiving the upload confirmation (step 204). Powering down may completely power off of wireless device 101, put wireless device 101 in a standby mode, put one or more communication interfaces and/or processing systems of wireless device 101 into a standby mode, or any other method whereby wireless device 101 is using less power than it would when communicating with CDN 102.

After powering down, wireless device 101 powers up and obtains the media content (step 206). Wireless device 101 may power up and power back down at times between steps 204 and 206 according to other operating circumstances for wireless device 101. The media content may be obtained from a storage system in wireless device 101, such as flash memory or a hard disk, from another system or device, from a communication network, from a content generation element, such as a camera or microphone on wireless device 101, or any other method of obtaining content. For example, wireless device 101 may be uploading a video captured by wireless device 101 at the request of a user of wireless device 101. That video may be stored in memory on wireless device 101 or elsewhere. Alternatively, the video itself may be captured at step 206.

After powering up and during the upload time, the media content is transferred from wireless device 101 for delivery to CDN 102 based on the upload confirmation, wherein CDN 102 subsequently transfers the media content to user device 103 among other user devices (step 208). Accordingly, upon powering up wireless device 101 the media content is obtained so that the media content can be uploaded to CDN 102 at the upload time confirmed during the upload registration request and confirmation in steps 200 and 202. Once the media content is in CDN 102, user device 103 and other user devices can request the media content from CDN 102. User device 103 may be the same type of device as wireless device 101 or some other computing device capable of communicating with CDN 102.

In some embodiments, at least one rule is transferred to CDN 102 with the upload registration request, with the media content, or otherwise. Each rule may indicate a time when user devices can access the media content on CDN 102, which user devices can access the media content on CDN 102, an inclusive or exclusive geographic area where user devices may be located to access the media content on CDN 102, or any other rule limiting the user devices that can access the media content on CDN 102.

In an example of the operation in FIG. 2 where wireless device 101 has an alternative power source, wireless device 101 may be a measurement system having sensors located thereon. For example, wireless device 101 may be an environmental system including environmental sensors for obtaining environmental data, such as temperature, humidity, and pressure, among other types of data. Wireless device 101 may therefore be powered by solar energy through the use of solar panels, or some other type of solar energy capture apparatus, so that wireless device 101 can be left in a remote area without the need for another power source. Due to the nature of wireless communications, wireless device 101 may want to transfer data a time when the sun is providing the most energy to wireless device 101 so that a wireless communication interface can use that power.

Accordingly, wireless device 101 registers with CDN 102 to transfer captured environmental data to CDN 102 at a time when the sun is most likely to be providing enough energy to operate the wireless communication interface and then powers down at least the wireless communication interface. The environmental sensors may continue running to collect data. When the upload time arrives, wireless device 101 powers up the wireless communication interface and transfers collected environmental data to CDN 102. A researcher using user device 103 can then access the data from CDN 102.

In some embodiments, the upload registration may indicate that the media content uploads are periodic. In the context of the preceding example, wireless device 101 may indicate that wireless device 101 will upload collected environmental data at the same time each day or each week. Thus, a standing registration will exist in CDN 102 for wireless device 101 to periodically upload media content.

Advantageously, using the above method, wireless device 101 is able to register a media content upload to CDN 102 so that the upload occurs during a time better suited for wireless device 101, CDN 102, or some compromise between the two.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, measurement system, or some other wireless communication apparatus—including combinations thereof.

Content distribution network 102 comprises network elements that provide media content from wireless device 101 to user devices including user device 103. Content distribution network 103 may comprise switches, wireless access nodes, Internet routers, network gateways, application servers, computer systems, communication links, or some other type of communication equipment—including combinations thereof.

User device 103 comprises wired and/or wireless communication circuitry used for communicating over communication link 112. User device 103 may also include a user interface, memory device, software, processing circuitry, or some other communication components. User device 103 may be a telephone, computer, server, e-book, mobile Internet appliance, wireless and/or wired network interface card, media player, game console, or some other communication apparatus—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
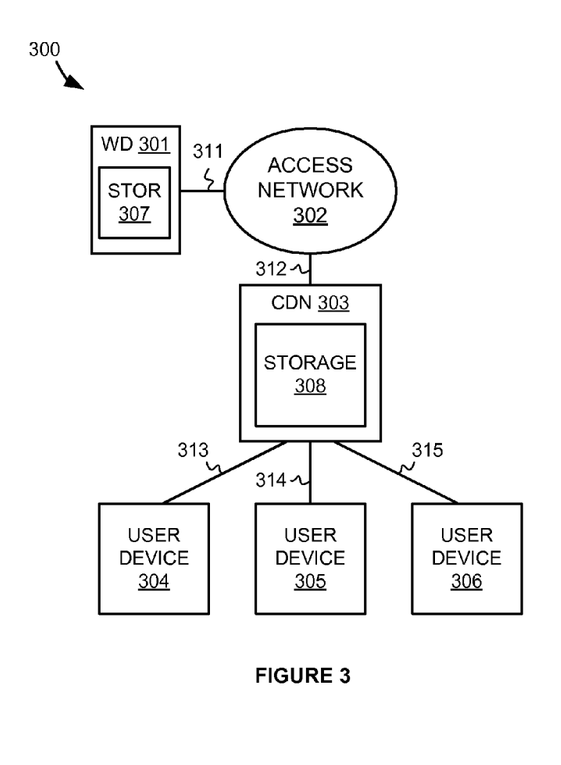
FIG. 3 illustrates a wireless communication system for registering media content with a CDN for transfer at a later time.

FIG. 3 illustrates wireless communication system 300. Wireless communication system 300 includes wireless communication device 301, wireless access network 302, content distribution network (CDN) 303, and user devices 304-306. Wireless communication device 301 includes storage 307 and CDN 303 includes storage 308. Storage 307 and storage 308 may each be any type of storage medium including flash memory, random access memory, hard disk drive(s), or any other type of non-transitory storage medium.

Wireless communication device 301 and wireless access network 302 communicate over wireless link 311. Wireless access network 302 and CDN 303 communicate over communication link 312. CDN 303 and user devices 304-306 communicate over communication links 313-315, respectively.

Wireless access network 302 comprises network elements that provide communications services to wireless device 301 through wireless access nodes. Wireless access network 302 may comprise switches, wireless access nodes, Internet routers, network gateways, application servers, computer systems, communication links, or some other type of communication equipment—including combinations thereof. While user devices 304-306 are not shown to communicate with access network 302, one or more of user devices 304-306 may use access network 302 to communicate with CDN 303. Alternatively, user devices 304-306 may use other wired or wireless communication networks to communicate with CDN 303. In addition, while CDN 303 is shown external to access network 302, at least part of CDN 303 may be located within access network 302.

Figure 4:
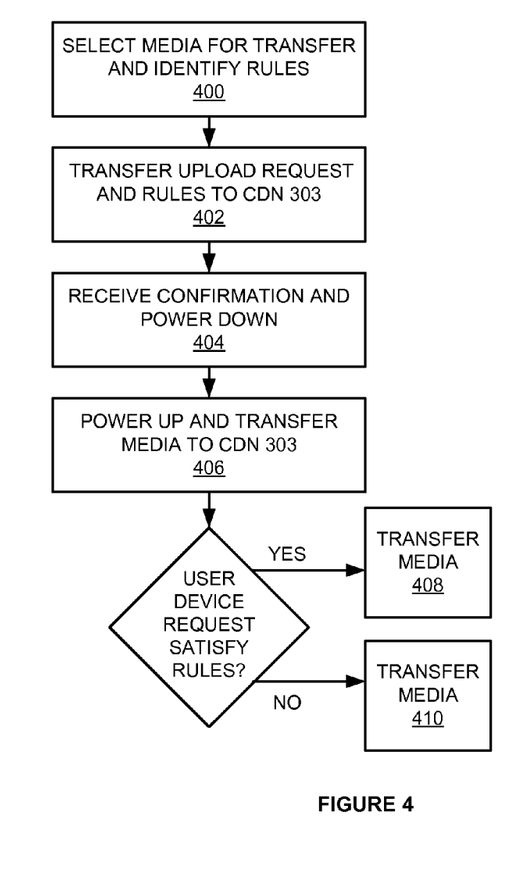
FIG. 4 illustrates the operation of the wireless communication system for registering media content with a CDN for transfer at a later time.

FIG. 4 illustrates the operation of wireless communication system 300 to register media content with a CDN for transfer at a later time. In operation, media is selected for transfer to CDN 303 and rules are identified for the distribution of the media content to user devices 304-306 (step 400). This media content may be audio/video files, websites, documents, software, sensor data, or any other type of data. The media content may be content stored on in storage 307 of wireless device 301. The media content may be selected by a user for upload to CDN 303, may be selected by wireless device itself, such as for automatic upload, or by some other system instructing wireless device 101. For example, CDN 303 may be part of a cloud computing service for wireless device 301 and wireless device 301 uploads captured media to CDN 303 as part of this cloud computing service.

The rules may similarly be identified by a user of wireless device 301, by wireless device 301 itself, or by some other system instructing wireless device 301. For example, the user of wireless device 301 may indicate that only user devices of the user's friends and family are allowed to access the media content. Each rule may indicate a time when user devices can access the media content on CDN 303, which user devices can access the media content on CDN 303, an inclusive or exclusive geographic area where user devices may be located to access the media content on CDN 303, or any other rule limiting the user devices that can access the media content on CDN 303.

Once the media content and rules are selected, wireless device 301 transfers an upload registration request and the rules to CDN 303 (step 402). The upload registration request may include a requested upload time that wireless device 301 is requesting for the upload. The requested upload time may be indicated by a user of wireless device 301 or may be determined by wireless device 301 itself. For example, the user may know when wireless device 301 can best handle an upload or wireless device 301 may have or be able to ascertain information about itself, such as battery life, access network 302, or CDN 303 when determining a requested upload time. Alternatively, wireless device 301 may determine an upload time. Wireless device 301 may be able to determine the upload time based on historical usage patterns of wireless device 301.

In some embodiments, CDN 303 may merely consider the requested upload time when determining when the media content upload should occur. Hence, CDN 303 may obtain further information and requirements for use when determining an appropriate upload time. Alternatively, wireless device 301 may require that the requested upload time be met at least to within a threshold amount of time in order for CDN 303 to confirm the upload registration request. Thus, if the requested upload time cannot be met, then CDN 303 will transfer a message to wireless device 301 denying the upload registration request.

Once the upload time determined or approved by CDN 303, CDN 303 transfers an upload confirmation to wireless device 301. The upload confirmation includes any information that wireless device 301 will need to upload the media content to CDN 303 including, but not limited to, the upload time and a destination network address for the upload. Wireless device 301 receives this confirmation and powers down (step 404). Powering down may completely power off of wireless device 301, put wireless device 301 in a standby mode, put one or more communication interfaces and/or processing systems of wireless device 301 into a standby mode, or any other method whereby wireless device 301 is using less power than it would when communicating with CDN 303.

At a later time, wireless device 301 powers up and transfers the media content to CDN 303 at the upload time and based upon any other upload information indicated by the upload confirmation (step 406). The later time may be the upload time indicated by the upload confirmation or may be some time before the upload time so that wireless device 301 has time to prepare the media content before commencing with the upload at the upload time. An application executing on wireless device 301 to control the upload may instruct wireless device 301 to power up. The application may take advantage of an application programming interface (API) in an operating system of wireless device 301 to perform the functionality. The application may be an application that manages the media content, such as a media viewing/management application, or may be a separate application.

CDN 303 receives the media content from wireless device 301 and stores the media content in storage 308. Storage 308 may be located in a single system of CDN 303 or may be spread across multiple systems. For example, a copy of the media content may be stored on multiple servers of CDN 303. Each server may be located in a separate access network, such as access network 302, so that the media content can more efficiently be distributed to user devices connected to each network.

After the media content is uploaded, user devices 304-306 can request the media content from CDN 303. If the request from a particular user device satisfies the rules transferred at step 402, then CDN 303 transfers the media content to the user device (step 408). However, if the request from the particular user device does not satisfy the rules transferred at step 402, then CDN 303 does not transfer the media content to the user device (step 410).

For example, the rules may indicate that the media content can only be accessed after a given time. A content request that is received before that given time is denied while a content request received after that time is allowed and the media content is transferred to the requesting device.

Figure 5:
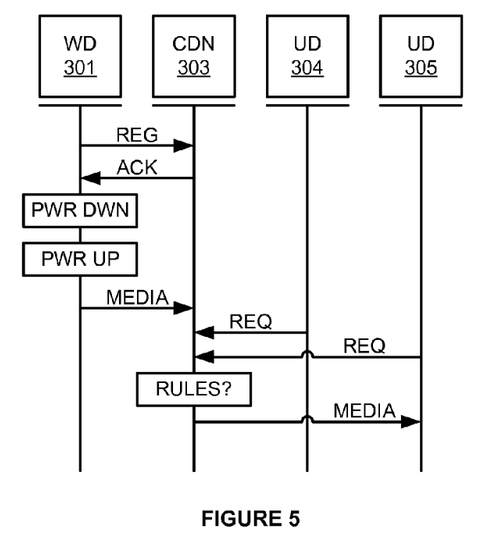
FIG. 5 is a sequence diagram illustrating the operation of the wireless communication system for registering media content with a CDN for transfer at a later time.

FIG. 5 is a sequence diagram that illustrates the operation of wireless communication system 300 to register media content with a CDN for transfer at a later time. The sequence begins with wireless device transferring an upload registration request to CDN 303 via access network 302. The upload registration request indicates that wireless device 301 is requesting to upload media content at an upload time provided in the request and includes any rules governing CDN 303's distribution of the media content to user devices after the media content is received. The upload registration request may further indicate information about the file, such as file size or type.

CDN 303 then transfers an acknowledgment of the upload registration request to wireless device 301. The acknowledgement message includes a confirmation that wireless device 301 will be allowed to upload the media content at the requested time or at some other time indicated in the acknowledgement. The acknowledgment may further include any information necessary for wireless device 301 to upload the media content. After receiving the acknowledgement message, wireless device 301 powers down.

Upon reaching the upload time or at some time before the upload time, wireless device 301 powers up so that wireless device 301 can upload the media content to CDN 303. After powering up, wireless device 301 uploads the media content at the upload time based on the information received in the acknowledgment message.

After the media content has been received by CDN 303 and stored in storage 308, CDN 303 receives requests for the media content from user devices 304 and 305, respectively. CDN 303 applies the rules for distributing the media content to the requests and determines that user device 305 can access the media content and user device 304 cannot. While the sequence shows that the rules are applied after both of the requests were received, CDN 303 may apply rules to requests as they arrive. Upon determining that user device 305 can access the media content, CDN 303 transfers the media content to user device 305.

In an example, user device 304 may not be allowed to access the media content because user device 304 is not within a geographic area indicated by the rules and user device 305 is located within that geographic area.

Figure 6:
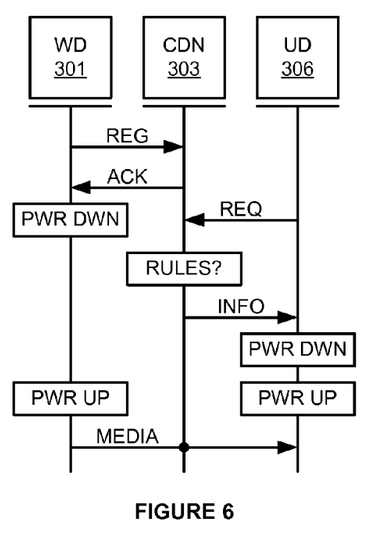
FIG. 6 is a sequence diagram illustrating the operation of the wireless communication system for registering media content with a CDN for transfer at a later time.

FIG. 6 is a sequence diagram that illustrates the operation of wireless communication system 300 to register media content with a CDN for transfer at a later time. In this embodiment, wireless device 301 and user device 306 are capable of transferring data between each other using machine-to-machine communications.

The sequence begins with wireless device transferring an upload registration request to CDN 303 via access network 302. The upload registration request indicates that wireless device 301 is requesting to upload media content at an upload time provided in the request and includes any rules governing CDN 303's distribution of the media content to user devices after the media content is received. The upload registration request may further indicate information about the file, such as file size or type.

CDN 303 then transfers an acknowledgment of the upload registration request to wireless device 301. The acknowledgement message includes a confirmation that wireless device 301 will be allowed to upload the media content at the requested time or at some other time indicated in the acknowledgement. The acknowledgment may further include any information necessary for wireless device 301 to upload the media content. After receiving the acknowledgement message, wireless device 301 powers down.

At some time after wireless device 301 has received the acknowledgment from CDN 303, user device 306 requests access to the media content. CDN 303 applies the rules to the request from user device 306 to determine whether user device 306 is able to access the media content. For example, the rules may indicate that only user device 306 is able to access the media content. Upon determining that user device 306 can access the media content, CDN 303 transfers information to user device 306 indicating how and when user device 306 may obtain the user content. In this example, the information indicates the upload time to user device 306 and any information necessary for user device 306 to communicate with wireless device 301 at the upload time. For example, the information may include information necessary for user device 306 to communicate with wireless device 301 directly or may include information necessary for user device 306 to communicate with wireless device 301 using CDN 303 as an intermediate system. After receiving the information, user device 306 is able to power down in a manner similar to wireless device 301. In an alternative embodiment, CDN 303 may transfer a paging notification to user device 306 when the upload time is reached rather than transfer the information before hand.

Upon reaching the upload time or at some time before the upload time, wireless device 301 powers up so that wireless device 301 can upload the media content. User device 306 similarly powers up so that user device 306 can receive the media content from wireless device 301. Wireless device 301 and user device 306 connect to each other at the upload time and wireless device 301 uploads the media content to user device 306. Wireless device 301 may connect to directly to user device 306 using information provided by CDN 303 when wireless device 301 powered up or wireless device 301 may communicate with user device 306 using CDN 303 as an intermediate system. If CDN 303 acts as an intermediate system, then CDN 303 may store the media content in storage 308 for future access by wireless device 301 or any allowed user devices.

Advantageously, if both wireless device 301 and user device 306 have limitations on their ability to exchange media content, such as battery usage limitations, then both wireless device 301 and user device 306 can minimize powered up time while still being able to perform a machine-to-machine exchange of media content.

Figure 7:
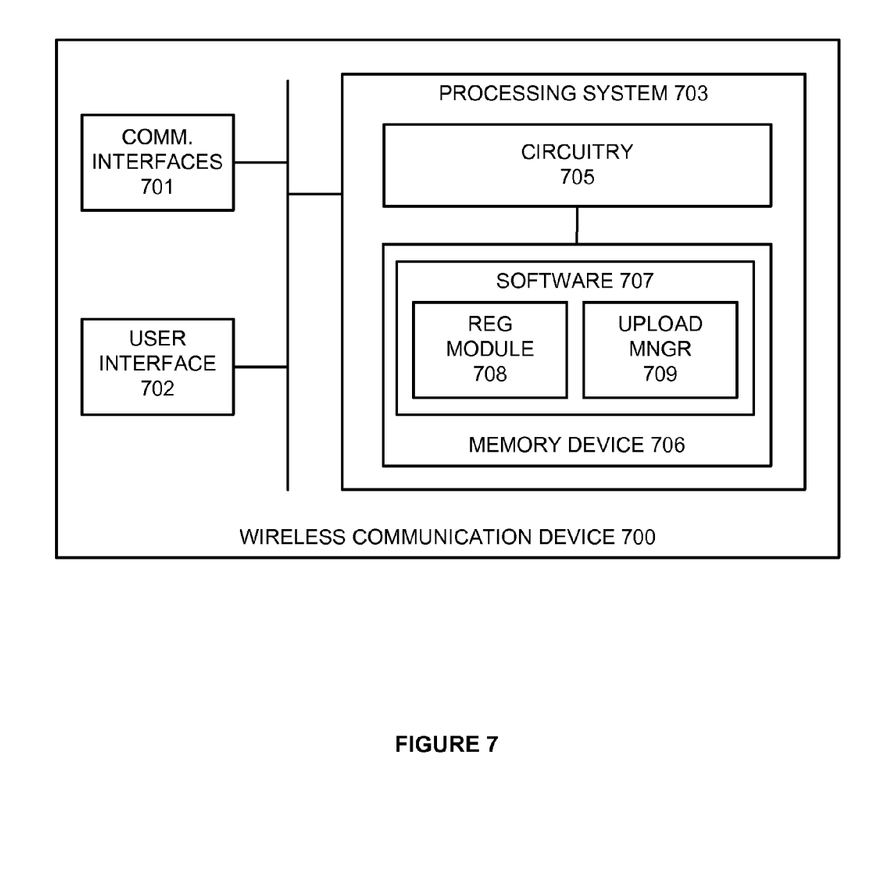
FIG. 7 illustrates a wireless communication device for registering media content with a CDN for transfer at a later time.

FIG. 7 illustrates wireless communication device 700. Wireless communication device 700 is an example of wireless communication devices 101 and 301, although devices 101 and 301 could use alternative configurations. Wireless communication device 700 comprises wireless communication interface 701, user interface 702, and processing system 703. Processing system 703 is linked to wireless communication interface 701 and user interface 702. Processing system 703 includes processing circuitry 705 and memory device 706 that stores operating software 707. Wireless communication device 700 may include other well-known components such as a battery and enclosure that are not shown for clarity. Wireless communication device 700 may be a telephone, computer, e-book, mobile Internet appliance, media player, game console, wireless network interface card, or some other wireless communication apparatus—including combinations thereof.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, EVDO, WIMAX, GSM, LTE, WIFI, HSPA, or some other wireless communication format.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes registration module 708 and upload management module 709. Operating software 707 may further include an operating system, utilities, drivers, network interfaces, applications, or some other type of software. When executed by processing circuitry 705, operating software 707 directs processing system 703 to operate wireless communication device 700 as described herein.

In particular, registration module 708 directs processing system 703 to transfer an upload registration request via wireless communication interface 701 to a content distribution network (CDN) that indicates wireless communication device 700 and an upload time. Registration module 708 further directs processing system 703 to receive an upload confirmation via wireless communication interface 701 transferred from the CDN confirming the upload registration request and to power down wireless communication device 700 after receiving the upload confirmation. Upload management module 709 directs processing system 703 to power up and obtain the media content. After powering up and during the upload time, upload management module 709 directs processing system 703 to transfer the media content via wireless communication interface 701 for delivery to the CDN based on the upload confirmation, wherein the CDN subsequently transfers the media content to user devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device to deliver media content to a plurality of user devices over a Content Distribution Network (CDN), the method comprising:

transferring an upload registration request to the CDN that indicates the wireless communication device and an upload time for the media content;

receiving an upload confirmation transferred from the CDN confirming the upload registration request;

powering down after receiving the upload confirmation and before the upload time;

after powering down, powering up and obtaining the media content;

after powering up and during the upload time, transferring the media content for delivery to the CDN based on the upload confirmation, wherein the CDN subsequently transfers the media content to the user devices.

2. The method of claim 1, wherein the wireless communication device uses solar power.

3. The method of claim 1, wherein the wireless communication device uses battery power.

4. The method of claim 1, wherein the wireless communication device comprises a camera and the media content comprises camera video.

5. The method of claim 1, wherein the wireless communication device comprises an environmental sensor and the media content comprises environmental data.

6. The method of claim 1, wherein the transfer of the media content from the wireless communication device to at least some of the user devices comprises a machine-to-machine communication.

7. The method of claim 1, wherein the upload registration request indicates at least one rule for transferring the content from the CDN to the user devices.

8. The method of claim 1, wherein the upload registration request indicates a download time when the content can be transferred to the user devices.

9. The method of claim 1, wherein the upload registration request indicates geographic areas where the media content may be transferred.

10. The method of claim 1, wherein the upload registration request indicates geographic areas where the media content may not be transferred.

11. A wireless communication device to deliver media content to a plurality of user devices over a Content Distribution Network (CDN), comprising:

a wireless communication interface configured to transfer an upload registration request to the CDN that indicates the wireless communication device and an upload time for the media content and receiving an upload confirmation transferred from the CDN confirming the upload registration request;

a processing system configured to power down after receiving the upload confirmation and before the upload time, power up after powering down and obtain the media content;

the wireless communication interface further configured to, after powering up and during the upload time, transfer the media content for delivery to the CDN based on the upload confirmation, wherein the CDN subsequently transfers the media content to the user devices.

12. The wireless communication device of claim 11, wherein the wireless communication device uses solar power.

13. The wireless communication device of claim 11, wherein the wireless communication device uses battery power.

14. The wireless communication device of claim 11, wherein the wireless communication device further comprises a camera and the media content comprises camera video.

15. The wireless communication device of claim 11, wherein the wireless communication device further comprises an environmental sensor and the media content comprises environmental data.

16. The wireless communication device of claim 11, wherein the transfer of the media content from the wireless communication device to at least some of the user devices comprises a machine-to-machine communication.

17. The wireless communication device of claim 11, wherein the upload registration request indicates at least one rule for transferring the content from the CDN to the user devices.

18. The wireless communication device of claim 11, wherein the upload registration request indicates a download time when the content can be transferred to the user devices.

19. The wireless communication device of claim 11, wherein the upload registration request indicates geographic areas where the media content may be transferred.

20. The wireless communication device of claim 11, wherein the upload registration request indicates geographic areas where the media content may not be transferred.

* * * * *